United States Patent
McCabe et al.

(10) Patent No.: US 9,836,417 B2
(45) Date of Patent: Dec. 5, 2017

(54) BRIDGE CONFIGURATION IN COMPUTING DEVICES

(71) Applicant: Western Digital Technologies, Inc., Irvine, CA (US)

(72) Inventors: Timothy J. McCabe, Mission Viejo, CA (US); Michael F. Klett, Lake Forest, CA (US); Edwin D. Barnes, Lake Forest, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 189 days.

(21) Appl. No.: 14/737,307

(22) Filed: Jun. 11, 2015

(65) Prior Publication Data

US 2016/0306757 A1    Oct. 20, 2016

Related U.S. Application Data

(60) Provisional application No. 62/150,132, filed on Apr. 20, 2015.

(51) Int. Cl.
*G06F 13/16* (2006.01)
*G06F 12/02* (2006.01)
(Continued)

(52) U.S. Cl.
CPC ............ *G06F 13/1694* (2013.01); *G06F 8/63* (2013.01); *G06F 8/665* (2013.01); *G06F 9/4401* (2013.01);
(Continued)

(58) Field of Classification Search
CPC ........ G06F 13/1694; G06F 8/63; G06F 8/665; G06F 12/0246; G06F 9/4401
See application file for complete search history.

(56) References Cited

U.S. PATENT DOCUMENTS 5,894,425 A * 4/1999 Saliba ............. G01R 31/31915
345/169
6,499,054 B1   12/2002 Hesselink et al.
(Continued)

FOREIGN PATENT DOCUMENTS

WO    2012062632 A1    5/2012

OTHER PUBLICATIONS

International Search Report and Written Opinion for PCT/US2016/026482 dated Jul. 18, 2016.
(Continued)

*Primary Examiner* — Nimesh G Patel
(74) *Attorney, Agent, or Firm* — Chang & Hale LLP (57) ABSTRACT

Systems and methods are disclosed for configuring an interface bridge. A computing system includes a device controller, an interface bridge module coupled to the device controller configured to provide bridge functionality according to a first communication standard, a primary communication interface conforming to the first communication standard and coupled to the interface bridge module. The computing system further includes a first non-volatile memory module coupled to the interface bridge module, the first non-volatile memory module storing first stage boot loader code, a second non-volatile memory module coupled to the device controller, and a secondary communication interface conforming to a second communication standard coupled to the device controller. The device controller is configured to receive update package data over the secondary communication interface, the update package data including a firmware image, and write the update package data to the second non-volatile memory module.

19 Claims, 5 Drawing Sheets

(51) Int. Cl.
*G06F 13/28* (2006.01)
*G06F 9/445* (2006.01)
*G06F 9/44* (2006.01)

(52) U.S. Cl.
CPC .......... *G06F 12/0246* (2013.01); *G06F 13/28* (2013.01); *G06F 2212/7208* (2013.01)

(56) References Cited

U.S. PATENT DOCUMENTS

| | | |
|---|---|---|
| 6,732,158 B1 | 5/2004 | Hesselink et al. |
| 7,120,692 B2 | 10/2006 | Hesselink et al. |
| 7,454,443 B2 | 11/2008 | Ram et al. |
| 7,467,187 B2 | 12/2008 | Hesselink et al. |
| 7,546,353 B2 | 6/2009 | Hesselink et al. |
| 7,587,467 B2 | 9/2009 | Hesselink et al. |
| 7,600,036 B2 | 10/2009 | Hesselink et al. |
| 7,788,404 B2 | 8/2010 | Hesselink et al. |
| 7,917,628 B2 | 3/2011 | Hesselink et al. |
| 7,934,251 B2 | 4/2011 | Hesselink et al. |
| 7,949,564 B1 | 5/2011 | Hughes et al. |
| 8,004,791 B2 | 8/2011 | Szeremeta et al. |
| 8,255,661 B2 | 8/2012 | Karr et al. |
| 8,285,965 B2 | 10/2012 | Karr et al. |
| 8,341,117 B2 | 12/2012 | Ram et al. |
| 8,341,275 B1 | 12/2012 | Hesselink et al. |
| 8,352,567 B2 | 1/2013 | Hesselink et al. |
| 8,526,798 B2 | 9/2013 | Hesselink |
| 8,631,284 B2 | 1/2014 | Stevens |
| 8,646,054 B1 | 2/2014 | Karr et al. |
| 8,661,507 B1 | 2/2014 | Hesselink et al. |
| 8,688,797 B2 | 4/2014 | Hesselink et al. |
| 8,713,265 B1 | 4/2014 | Rutledge |
| 8,762,682 B1 | 6/2014 | Stevens |
| 8,780,004 B1 | 7/2014 | Chin |
| 8,793,374 B2 | 7/2014 | Hesselink et al. |
| 8,819,443 B2 | 8/2014 | Lin |
| 9,177,122 B1 * | 11/2015 | Trier ..................... G06F 21/572 |
| 2005/0144195 A1 | 6/2005 | Hesselink et al. |
| 2005/0144200 A1 | 6/2005 | Hesselink et al. |
| 2005/0229042 A1 | 10/2005 | Crowell et al. |
| 2006/0282571 A1 * | 12/2006 | Choi ......................... G06F 8/65 710/62 |
| 2007/0174686 A1 * | 7/2007 | Douglas ............. G06F 11/2097 714/13 |
| 2010/0199078 A1 | 8/2010 | Shih et al. |
| 2011/0225349 A1 * | 9/2011 | Holbrook ........... G06F 13/4022 711/103 |
| 2012/0036041 A1 | 2/2012 | Hesselink |
| 2013/0212401 A1 | 8/2013 | Lin |
| 2013/0227540 A1 * | 8/2013 | Ruster ...................... G06F 8/65 717/170 |
| 2013/0266137 A1 | 10/2013 | Blankenbeckler et al. |
| 2013/0268749 A1 | 10/2013 | Blankenbeckler et al. |
| 2013/0268759 A1 | 10/2013 | Blankenbeckler et al. |
| 2013/0268771 A1 | 10/2013 | Blankenbeckler et al. |
| 2014/0089710 A1 * | 3/2014 | Yeh ................... H04W 52/0296 713/323 |
| 2014/0095439 A1 | 4/2014 | Ram |
| 2014/0169921 A1 | 6/2014 | Carey |
| 2014/0173215 A1 | 6/2014 | Lin et al. |

OTHER PUBLICATIONS

Timothy J. McCabe, et al., U.S. Appl. No. 14/605,910, filed Jan. 26, 2015, 19 pages.

* cited by examiner

BRIDGE CONFIGURATION IN COMPUTING DEVICES

CROSS-REFERENCE TO RELATED APPLICATION

This application claims priority to provisional U.S. Patent Application Ser. No. 62/150,132, filed on Apr. 20, 2015, which is hereby incorporated by reference in its entirety.

BACKGROUND

Computing systems, such as embedded systems, may have operational firmware programmed in non-volatile memory of the system that directs operation of the system. Various data communication interfaces may be used to program one or more components of the system.

BRIEF DESCRIPTION OF THE DRAWINGS

Various embodiments are depicted in the accompanying drawings for illustrative purposes, and should in no way be interpreted as limiting the scope of this disclosure. In addition, various features of different disclosed embodiments can be combined to form additional embodiments, which are part of this disclosure.

DETAILED DESCRIPTION

While certain embodiments are described, these embodiments are presented by way of example only, and are not intended to limit the scope of protection. Indeed, the novel methods and systems described herein may be embodied in a variety of other forms. Furthermore, various omissions, substitutions and changes in the form of the methods and systems described herein may be made without departing from the scope of protection.

The headings provided herein are for convenience only and do not necessarily affect the scope or meaning of the claims. Disclosed herein are example configurations and embodiments relating to configuration of communication interface devices.

Overview

Disclosed herein are systems and methods for indirectly updating and programming firmware for a communication interface bridge associated with a primary host interface (e.g., Universal Serial Bus (USB) bridge device) over a secondary communication interface not directly connected to the bridge (e.g., Serial I/O (SIO)), which may be beneficial when a printed circuit board assembly (PCBA) is being processed, such as in a factory chamber. For example, certain embodiments are disclosed herein in the context of data storage devices including a device controller and an interface bridge for communicating with a host device/system over a primary host interface. Certain embodiments are disclosed herein in the context of configuring USB interfaces/bridges, though it should be understood that the disclosed features and embodiments may be applicable for systems having any type of host interface, such as PCIe, Ethernet, Thunderbolt, SATA, WiFi, or the like.

Although interface programming may be performed over the primary host interface, in certain situations, it may be desirable for native PCBA devices to be programmed without having to connect to the device over the primary host interface. For example, factory automation may be used to process the devices without manual operators for plugging in cables, and the like.

During factory processing, certain processes may be designed to communicate with devices under test via a backend, or secondary, communication interface. While certain embodiments are disclosed herein in the context of SIO backend/secondary interfaces, it should be understood that features and embodiments disclosed herein may be applicable to any practical or desirable interface. In certain systems, simultaneous communication over primary and secondary interfaces is not possible or desirable; when one interface is active, the other may generally be inactive, and vice versa.

Certain factory processes leave the primary interface component(s) in a default configuration. However, where it is desirable to provide the device being processed directly for operational use, such a configuration may be unacceptable. In certain embodiments, factory processing is managed and controlled via a secondary interface, such as SIO. Certain embodiments disclosed herein provide for writing a configuration image for an interface bridge to non-volatile memory of the device being processed, such as a hard drive or other non-volatile memory module, during, for example, final stages of processing of the device (e.g., data storage drive). When the bridge is enabled to run, certain stages of code loaders may be executed to read, validate and/or configure the bridge (e.g., USB) at the end of processing.

Computing System

Figure 1:
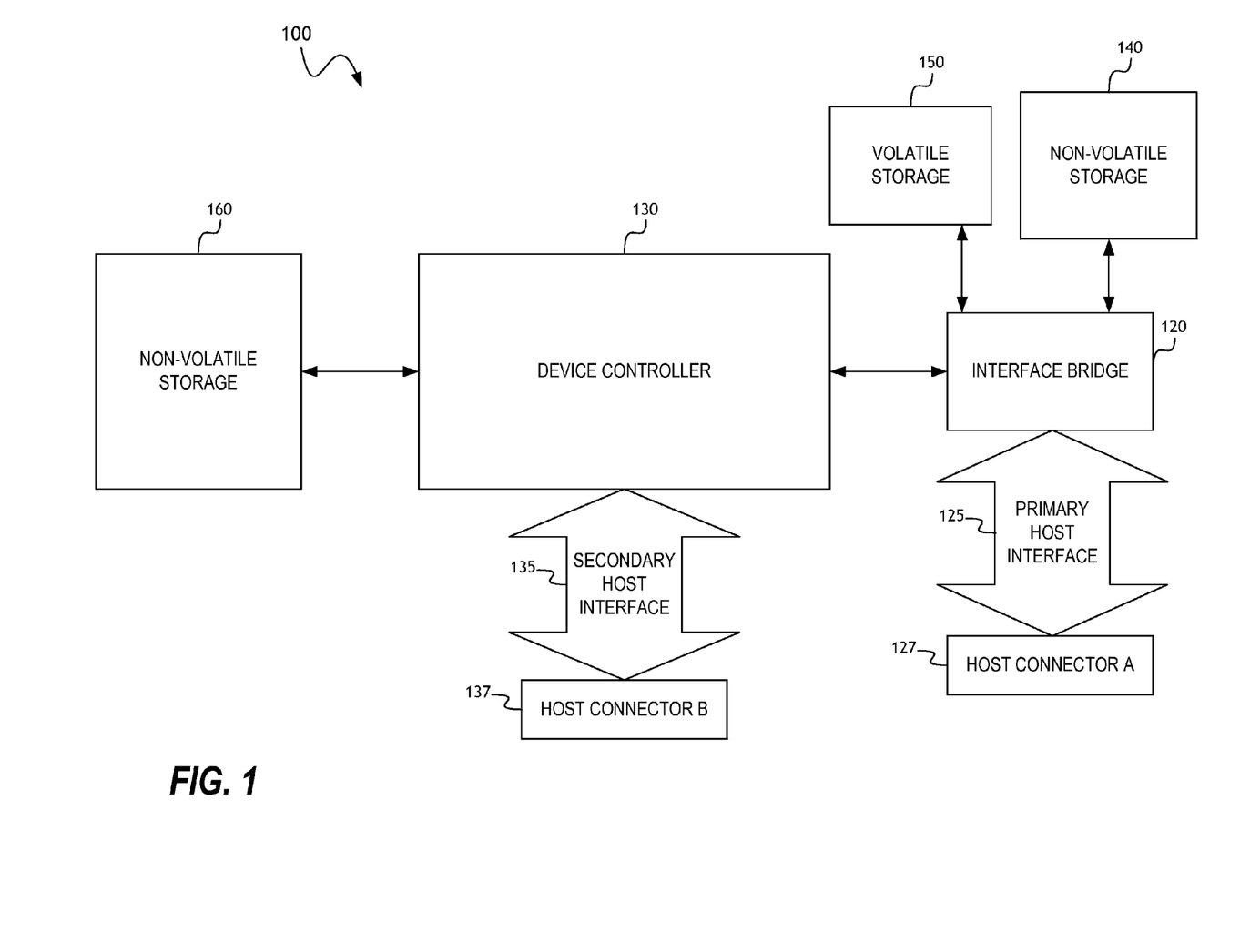
FIG. 1 is a block diagram of a computing system according to one or more embodiments.

FIG. 1 is a block diagram of a computing system according to one or more embodiments. The system 100 includes a device controller 130 as well as an interface bridge 120 configured to facilitate communication over a primary host interface 125. The system 100 may be, for example, an integrated USB storage drive. Certain embodiments disclosed herein enable the system/device 100 to be configured directly at the processing factory without having to be shipped for secondary processing at, for example, a third-party manufacturer.

The interface bridge 120 may be any type of bridge, such as USB, PCIe, Ethernet, or the like, and may be a wired or wireless communication interface. The interface bridge 120 may further be connected to and/or associated with one or more non-volatile storage modules 140, such as a flash memory device coupled to the interface bridge 120 over a serial peripheral interface (SPI) connection, as well as one or more volatile memory modules 150.

In certain embodiments, one or more of the illustrated components of the system 100 may be mounted to a printed circuit board (PCB), which may constitute a computing device (e.g., data storage drive) subject to processing/configuration as described herein.

The system 100 includes a secondary host communication interface 135, which may be coupled to a physical connector 137 designed to mate with host cable or otherwise connect to a host system. In certain embodiments, there may be no direct path/connection to program the non-volatile storage 140 (e.g., SPI flash) through the secondary interface 135 (e.g., SIO).

The secondary interface 135 may be a relatively simple serial interface used for processing purposes. In certain embodiments, when the secondary interface 135 is active, the interface bridge 120 and primary interface 125 may be held in reset in order to prevent both interfaces attempting to communicate with the device controller 130 simultaneously. In the factory environment, it may be desirable to implement solutions where code changes are required as infrequently as possible for certain parts of the process. For example, for PCBA testing, it may be beneficial to use code that is relatively stable for loading onto the PCBA; code modification at this stage may be problematic for various reasons.

Certain embodiments disclosed herein provide for the placement of a relatively basic "bootstrap" loader in the bridge non-volatile memory 140 (e.g., SPI flash) at a PCBA testing stage. A more sophisticated loader may subsequently be read from the mass storage 160 of the system directly, as directed by the basic loader code. The more sophisticated loader may be designed to perform further operations for configuring the interface bridge 120.

In order to make the firmware code of the device, it may be desirable for the functionality of the bootstrap loader (referred to herein as "first-stage loader" or "primary loader") to be relatively simple. For example, in certain embodiments, the first-stage loader is merely configured to bring the device to a ready state and read and validate the more sophisticated second-stage loader from the non-volatile storage 160 and copy it into system memory 150. If loaded successfully, the primary loader may pass process control to the second-stage loader. Since other code may be required during PCBA testing, in certain embodiments, the first-stage loader may be loaded at the end of PCBA testing. This process may provide the ability to enable the primary interface components through the secondary interface 135.

Figure 2:
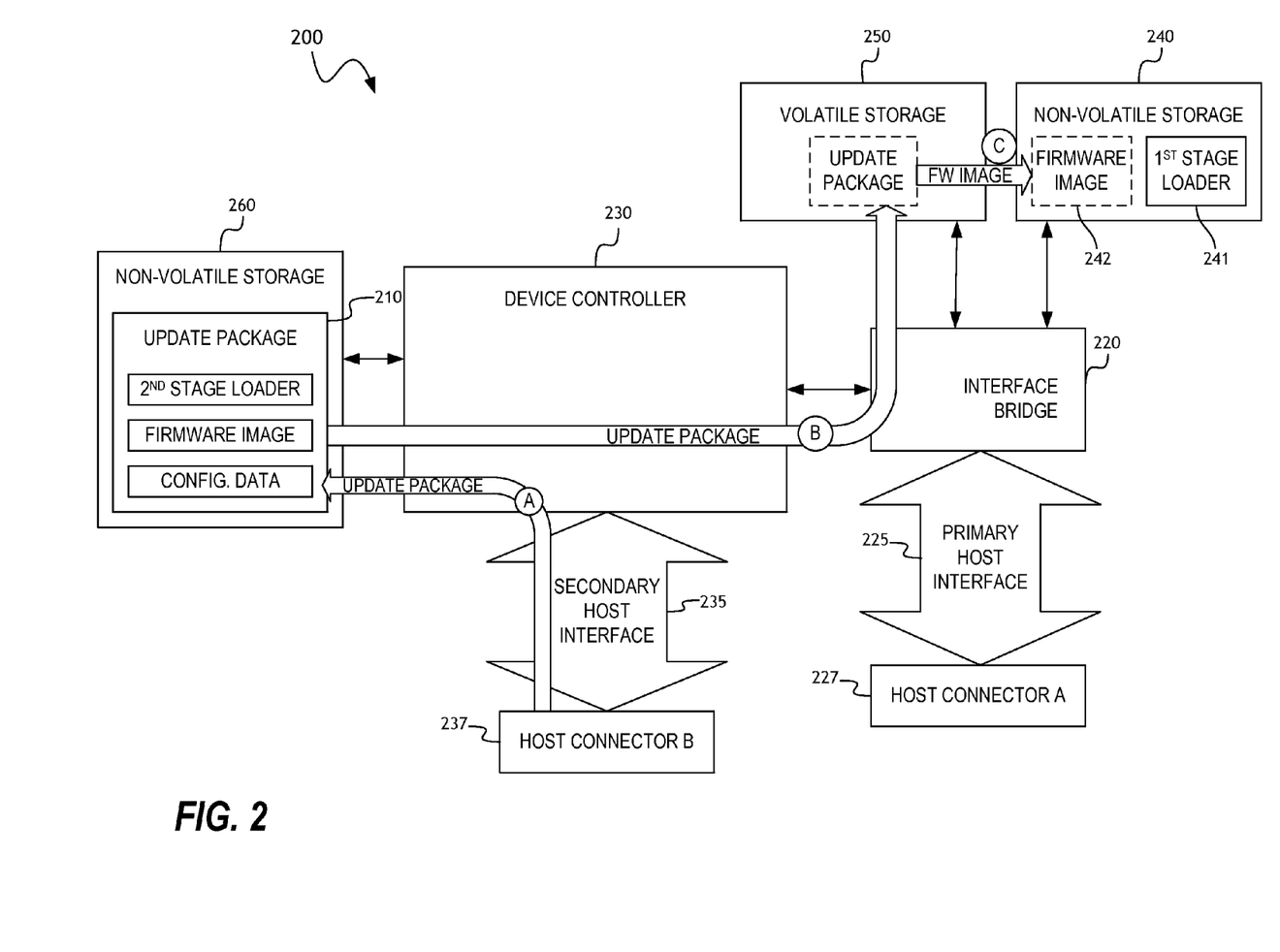
FIG. 2 is a block diagram of a computing system according to one or more embodiments.

FIG. 2 is a block diagram of a computing system 200 according to one or more embodiments. The diagram of FIG. 2 shows data flow for a process for configuring an interface bridge 220 over a secondary host interface 235. In an embodiment, the process may involve using an SIO interface to program firmware in a SPI flash device indirectly. The system/process of FIG. 2 may effectively provide for self-programming of the interface bridge 220, which may be desirable for high-volume manufacturing solutions.

As an initial step, the process demonstrated in FIG. 2 may involve storing code (referred to herein as the "update package") in non-volatile storage 260 that is common to both the primary and secondary interfaces, which may be performed over the secondary interface 235, as shown as flow 'A' in the figure.

The non-volatile storage 240 of the bridge 220 may be preloaded initially with a primitive firmware image 241 ("first-stage loader"). For example, the non-volatile memory 240 of the bridge may be programmed with certain firmware to copy, or "slurp," the final firmware image from non-volatile data storage 260 that is common to the primary and secondary interfaces. For example, the non-volatile storage 260 may be magnetic hard disk storage, or other mass storage, and may be coupled to the device controller 230 over a wired physical interface, or over a wireless network. In certain embodiments, the common storage 260 is accessible by the device controller 230 over the Internet or other wide-area network. The first-stage loader 241 stored in the non-volatile storage 240 of the bridge may include instructions for locating the common storage 260 and retrieving code therefrom.

In certain embodiments, the first-stage loader 241 only provides instruction to find the code on the common storage 260 and validate it. The code stored in the common storage includes second-stage loader code, which may be designed to take the validated update package and parse certain components thereof and copy them to the appropriate locations in the system 200.

The first-stage loader 241 running on the interface bridge may be designed to reach through the device controller 230 to retrieve the update package 210 stored in the non-volatile common storage 260 and load the update package to the volatile storage 250 attached to the interface bridge 220 over the bridge 220, as shown as flow 'B.' The non-volatile storage 240 may then be updated based on the update package. In certain embodiments, the first-stage loader comprises binary code that is bridge-vendor specific. In certain embodiments, the first-stage loader is less than approximately 20 kB in size. For example, the first-stage loader may be approximately 16 kB in size, or smaller. The first-stage loader may be loaded in the bridge memory 240 during PCBA testing.

In certain embodiments, the first-stage loader 241 performs the following steps: initialize the bridge 220 as necessary to bring the non-volatile common storage 260 to a ready state; spin-up the disk(s) of the non-volatile storage 260 (for hard disk embodiments only); and read a signature block of the update package 210 and verify that it is correct. If the update package 210 is not valid and correct, then the first-stage loader 241 may go to idle. The first-stage loader may further load the second-stage loader after it has validated the package and shift execution to the second-stage loader.

Once the update package 210 has been copied to the volatile storage 250, program flow may transfer to the second-stage loader in the update package. The process may further involve updating the firmware image in the non-volatile storage 240 by copying the firmware image from the update package to the non-volatile storage 240. Because the first-stage loader 241 is relatively primitive, firmware modifications may only be necessary with respect to the updated firmware image of the update package, which may be more easily modifiable in certain situations. For example, because the second-stage loader is relatively complex compared to the first-stage loader, it may change more often than the first-stage loader; since it is written on the mass storage 260, changing this code may be much simpler than modifying the first-stage loader in the bridge storage 240.

In certain embodiments, the second-stage loader performs one or more of the following steps: if necessary, bring the common storage 260 to a ready state; and validate configuration data of the update package 210. If the configuration data is invalid, status information may be updated to reflect the same and the second-stage loader may go idle. If the data is valid, the second-stage loader may then apply the changes and provide appropriate status information. In certain embodiments, the configuration data is written on the non-volatile storage 260 following the firmware image. Validating and applying the configuration data may further involve validating and applying OEM branding data, and/or the like.

The second-stage loader may further read and validate the firmware image (e.g., flash image) of the update package. If the flash image is invalid, the second-stage loader may provide the appropriate status information. The second-stage loader may further program a second firmware image area of the non-volatile storage 240 with the firmware image, as shown as flow 'C.' In certain embodiments, the first firmware image is not overwritten at this time. The second firmware image 242 may advantageously be written such that it is the bootable copy of firmware on the next power cycle. In certain embodiments, as a separate operation, the second-stage loader may erase and program the first firmware image area as well. After successful programming of the non-volatile storage 240, the second-stage loader may be configured post final status information indicating whether programming was successful, and further to set a factory freeze state.

The firmware image 242 (e.g., flash image), which is initially a component of the update package 210, may provide the production (i.e., final) bridge storage image (e.g., SPI flash image). In certain embodiments, there may be only a single copy of the target firmware.

Update Package

Figure 3:
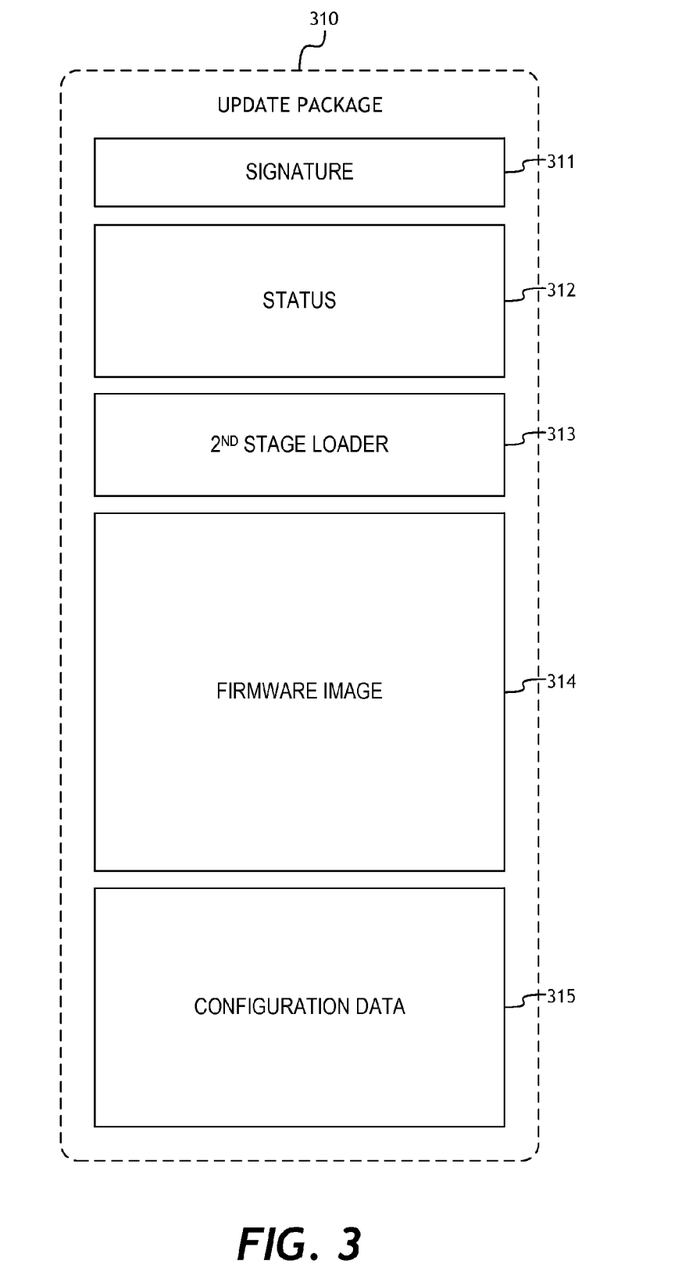
FIG. 3 is a block diagram of a data structure according to one or more embodiments.

FIG. 3 is a block diagram of a data structure ("update package") 310 according to one or more embodiments. For example, the data structure 310 may correspond to the update package 210 shown in FIG. 2 and described above. In certain embodiments, the update package 310 may be preloaded onto a non-volatile common storage of a computing system, as described herein. The update package may comprise the code for configuring, for example, an interface bridge module and/or associated components combined into a data structure, as shown.

The update package 310 may comprise various subcomponents, illustrated as blocks in the diagram of FIG. 3. Although separate blocks are illustrated for various components, it should be understood that the update package 310 and components thereof may be physically, logically and/or conceptually broken up in any desirable or practical configuration or representation. In one embodiment, the various blocks of the update package start on, for example, 4 kB boundaries.

The update package may include signature data 311, which may comprise one or more digital signatures that may be checked by first-stage loader code for validation purposes, as described above. In certain embodiments, the signature block 311 also contains a table of contents that indicates, for example, the starting logical block address (LBA) and the length in bytes.

The update package 310 may further include a status information block 312, which may be, for example, one block in length. The status structure may reflect a most recent status (e.g., progress) for the entire operation. In certain embodiments, the status block 312 may be preloaded with a failing status, and may only be updated by the first and second-stage loaders. The status block information 312 may be used to communicate to a factory process whether the process operation(s) completed successfully. The status block 312 may further include progress log information for capturing status information as the first and second-stage loaders progress through the update process.

The update package 310 further includes second-stage loader code 313, which may comprise code responsible for bringing the non-volatile common storage to a ready state (if necessary) and configuring the bridge and programming the non-volatile storage (e.g., flash) of the bridge. The second-stage loader 313 may further be configured to update the status block 312.

The update package 310 further includes a firmware image 314 (e.g., flash image), which may comprise, for example, a simple binary image of the final product code to be loaded in the non-volatile storage of the bridge. In certain embodiments, the second-stage loader 313 is configured to validate this data.

The update package 310 further includes configuration data 315, which may comprise parameters for configuring certain system functionality. In certain embodiments, the configuration data 315 is read by the second-stage loader and used to configure the firmware image 314.

The various components of the update package 310 may collectively provide all necessary code to program and configure, for example, a SPI flash device coupled to an interface bridge. In certain embodiments, the update package 310 may be used to program the bridge without using the native/primary host interface(s), but instead using a secondary (e.g., storage-side) interface.

Figure 4:
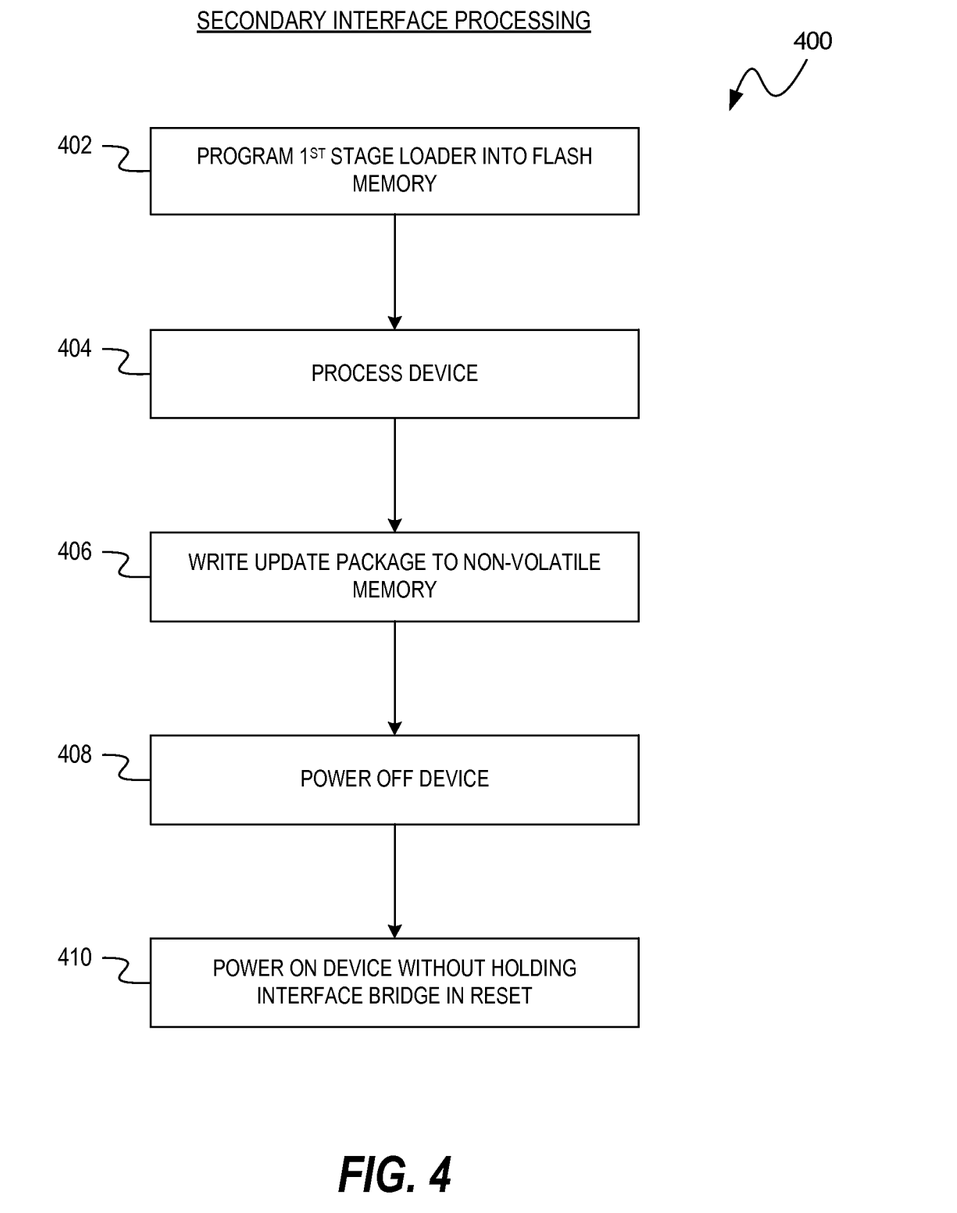
FIG. 4 is a flow diagram of a process for programming a memory device according to one or more embodiments.

FIG. 4 is a flow diagram of a process 400 for programming a memory device according to one or more embodiments. In certain embodiments, the process 400 may be performed at least in part as part of a PCBA testing/configuration procedure, wherein communication with the PCBA may be achieved through the a primary host interface (e.g., USB). Furthermore, at least part of the process 400 may be performed using a testing chamber, wherein communication with the PCBA may be achieved through a secondary serial interface (e.g., SIO).

At block 402, the process 400 involves programming first-stage loader code into a non-volatile memory module, such as a flash memory module, which may be configured to communicate with a host over a SPI interface. In certain embodiments, the step 402 may be performed as a final step of a PCBA testing process over the primary host interface. For example, SCSI commands may be transmitted over a primary USB interface to implement the programming of the first-stage loader.

Prior to programming the first-stage loader to the non-volatile bridge memory, a basic firmware image may be stored therein that comprises a substantially generic version of firmware compatible with the PCBA and used for processing of the PCBA. Such code may comprise basic code needed for testing purposes. According to certain embodiments, the first-stage loader may be loaded toward the end of the testing process to enable the backend interface (e.g., SIO) process to program the non-volatile bridge memory.

At block 404, the process 400 involves performing certain processing with respect to the computing device. Processing may involve certain defect management processes. In certain embodiments, device processing is performed in an environment-controlled chamber through a secondary serial interface (e.g., SIO). The environment-controlled chamber may provide temperature control for defect mapping purposes while the PCBA is captive in the chamber. Temperature control may allow for stress testing to find defects in the PCBA, such as in the media of the device.

At block 406, the process 400 involves writing an update package to non-volatile memory. For example, after defect mapping, SIO processing may conclude with writing an image (e.g., update package) on non-volatile data storage of the device being processed/tested. The image may be similar to the data structure illustrated in FIG. 3 and described above.

At block 408, the process 400 may involve powering-off the device being processed, wherein, at block 410, the device is powered on without holding the bridge in reset. By not holding the bridge in reset, the process 400 may allow for the bridge to be able to run the first-stage loader after the power cycle. At such point, communication with the device though the chamber interface may have been completed.

The bridge may subsequently execute the first-stage loader, which may include instructions to validate the update package image, load the update package including the second-stage loader into the volatile memory of the bridge, and jump to execution of the second-stage loader. The second-stage loader may generally be compatible with the firmware image released based on the two components being packaged and provided together. The second-stage loader may provide functionality to program configuration data, program the firmware image in the non-volatile memory of the bridge (e.g., SPI flash), and make the firmware image active.

Figure 5:
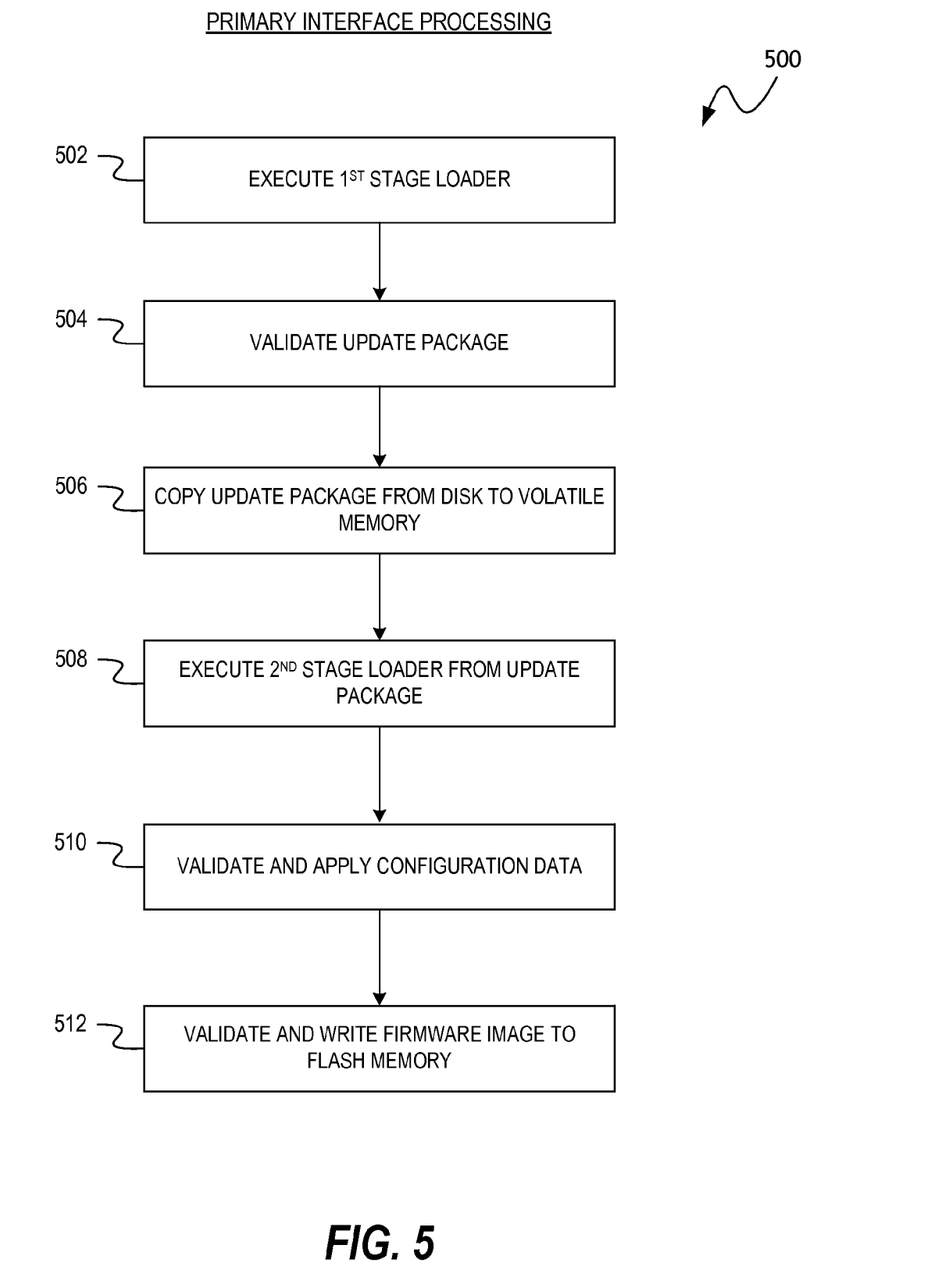
FIG. 5 is a flow diagram illustrating a process for configuring a computing device according to one or more embodiments.

FIG. 5 is a flow diagram illustrating a process 500 for configuring a computing device according to one or more embodiments. The process 500 may be performed subsequent to chamber testing/processing of a PCBA or other computing device, such as a data storage drive or other embedded system. The process 500 may represent a mechanism for programming the flash device, or other non-volatile memory module, through a backend/secondary interface.

At block 502, the process 500 involves executing first-stage loader code stored in non-volatile memory, such as the flash device coupled to an interface bridge device. For example, before implementing the primary interface processing of FIG. 5, a first-stage loader (i.e., pre-boot loader) may have been saved on the non-volatile memory of the bridge. In certain embodiments, the first-stage loader is relatively primitive; it may be advantageous for the first-stage loader to be primitive as it may be impractical or cumbersome to alter the code post facto.

At block 504, the process 500 involves validating an update package stored in non-volatile memory, such as a hard disk component of the device, or other non-volatile data storage. Similarly to the first-stage loader, the update package may have been preloaded as part of a previously-implemented process. The first-stage loader may be designed to verify a signature of the update package, for example.

At block 506, the process 500 involves copying the update package from the disk to volatile memory, which may be coupled to volatile memory of the bridge (e.g., flash device). The second-stage loader may be a component of the update package and therefore loaded with the update package.

At block 508, the process 500 involves executing the second-stage loader code, which may be a component of the update package copied to the volatile memory. The second-stage loader may direct the bridge to validate and apply configuration data, which may be a component of the update package, as shown at block 510. The configuration data may include OEM settings data. The second-stage loader may direct the bridge to set the required functionality and values specified in the configuration data.

At block 512, the process 500 involves validating and writing a firmware image of the update package to the non-volatile memory of the bridge (e.g., flash memory). In certain embodiments, the previous version of firmware stored in the non-volatile memory is not overwritten when block 512 is performed. As a separate step, the previous firmware version may be erased and overwritten with the updated firmware.

Once the programming of the bridge non-volatile memory is complete, the second-stage loader may execute a factory freeze operation and/or perform various status update operations. Posting status information may be useful for debugging purposes. In certain embodiments, after a pre-determined update time period has lapsed, the process 500 may involve powering the device down, and further repowering the device holding the bridge in reset to read the status information over the backend interface.

As disclosed, certain embodiments provide for backend bridge/interface programming by laying down certain data on the common storage of a device that can be retrieved by the bridge to allow it to effectively program itself. Certain embodiments may allow integrated USB data storage drives to be configured in the drive factory. Such systems and processes may effectively eliminate much of the work done by current software manufacturing tools, which may in turn reduce the cost of configuration steps performed by device manufacturers.

ADDITIONAL EMBODIMENTS

Those skilled in the art will appreciate that in some embodiments, other types of bridge configuration systems can be implemented while remaining within the scope of the present disclosure. In addition, the actual steps taken in the processes discussed herein may differ from those described or shown in the figures. Depending on the embodiment, certain of the steps described above may be removed, and/or others may be added.

While certain embodiments have been described, these embodiments have been presented by way of example only, and are not intended to limit the scope of protection. Indeed, the novel methods and systems described herein may be embodied in a variety of other forms. Furthermore, various omissions, substitutions and changes in the form of the methods and systems described herein may be made. The accompanying claims and their equivalents are intended to cover such forms or modifications as would fall within the scope and spirit of the protection. For example, the various components illustrated in the figures may be implemented as software and/or firmware on a processor, application-specific integrated circuit (ASIC), field-programmable gate array (FPGA), or dedicated hardware. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

All of the processes described above may be embodied in, and fully automated via, software code modules executed by one or more general purpose or special purpose computers or processors. The code modules may be stored on any type of computer-readable medium or other computer storage device or collection of storage devices. Some or all of the methods may alternatively be embodied in specialized computer hardware.

What is claimed is:

1. A computing system comprising:
  a device controller;
  an interface bridge module communicatively coupled to the device controller and configured to provide bridge functionality;
  a primary communication interface conforming to a first communication standard and communicatively coupled to the interface bridge module;
  a first non-volatile memory module communicatively coupled to the interface bridge module, the first non-volatile memory module storing first stage boot loader code;
  a second non-volatile memory module separate from the first non-volatile memory module and communicatively coupled to the device controller; and a secondary communication interface conforming to a second communication standard and communicatively coupled to the device controller;
wherein the device controller is configured to, while the interface bridge module is held in reset:
  receive update package data over the secondary communication interface, the update package data including a firmware image; and
  write the update package data to the second non-volatile memory module.

2. The computing system of claim 1, wherein the second communication interface is a serial interface.

3. The computing system of claim 1, wherein the update package data comprises:
  second stage boot loader code; and
  configuration data for configuring the interface bridge module.

4. The computing system of claim 1, wherein the device controller is further configured to:
  hold the secondary communication interface in reset;
  activate the primary communication interface;
  copy second stage boot loader code of the update package data from the second non-volatile memory module to a volatile memory module; and
  execute the second stage boot loader code from the volatile memory module.

5. The computing system of claim 4, wherein the second stage boot loader code, when executed by the device controller, causes the device controller to:
  validate configuration data of the update package data;
  apply the configuration data to configure the interface bridge module;
  validate the firmware image; and
  store the firmware image in the first non-volatile memory module.

6. The computing system of claim 1, further comprising a printed circuit board (PCB), wherein the device controller, interface bridge module, and first non-volatile memory module each comprise one or more chips mounted on the PCB.

7. The computing system of claim 1, wherein the first stage boot loader code, when executed by the device controller, causes the device controller to:
  initialize the interface bridge module;
  spin-up a magnetic disk of the second non-volatile memory module; and
  validate second stage boot loader code of the update package data stored in the second non-volatile memory module.

8. The computing system of claim 1, wherein the first stage boot loader code is less than 20 kB in size.

9. The computing system of claim 1, wherein the secondary communication interface is a Serial Input/Output (SIO) interface.

10. The computing system of claim 1, wherein the second non-volatile memory module comprises magnetic memory.

11. The computing system of claim 1, wherein the first non-volatile memory module is a Serial Peripheral Interface (SPI) flash memory module.

12. A method of programming firmware in a computing system, the method comprising:
  while holding an interface bridge module coupled to a primary communication interface in reset:
    receiving update package data over a secondary communication interface, the update package data comprising second stage boot loader code and a firmware image; and
    writing the update package data to a first non-volatile memory module;
  loading first stage boot loader code from a second non-volatile memory module to a volatile memory module, the second non-volatile memory module being separate from the first non-volatile memory module and communicatively coupled to the interface bridge module;
  executing the first stage boot loader code to:
    initialize the interface bridge module; and
    copy the update package data from the first non-volatile memory module to the volatile memory module; and
  executing the second stage boot loader code to copy the firmware image of the update package data from the volatile memory module to the second non-volatile memory module.

13. The method of claim 12, wherein the method is at least partially performed within an environment-controlled chamber.

14. The method of claim 12, wherein the update package data comprises configuration data for configuring the interface bridge module.

15. The method of claim 12, further comprising activating the primary communication interface after said writing the update package data to the first non-volatile memory module and before said executing the first stage boot loader code.

16. The method of claim 15, wherein executing the second stage boot loader code comprises:
  validating configuration data of the update package data;
  applying the configuration data; and
  validating the firmware image.

17. The method of claim 12, wherein the method is performed at least in part by a device controller mounted to a printed circuit board (PCB), wherein the interface bridge module and first non-volatile memory module each comprise one or more chips mounted to the PCB.

18. The method of claim 12, wherein said executing the first stage boot loader code further comprises:
  spinning-up a magnetic disk of the first non-volatile memory module; and
  validating the second stage boot loader code.

19. The method of claim 12, wherein the primary communication interface is a Universal Serial Bus (USB) interface.

* * * * *